United States Patent
Rudberg et al.

(10) Patent No.: US 8,084,010 B2
(45) Date of Patent: Dec. 27, 2011

(54) COAL/COKE/HEAVY RESIDUAL OIL BOILER WITH SULFUR AND CARBON DIOXIDE CAPTURE AND RECOVERY

(75) Inventors: Donald A. Rudberg, Bozeman, MT (US); Richard P. Schuller, Butte, MT (US); Donald W. Cott, North Pole, AK (US)

(73) Assignee: Plasma Energy Technologies Inc., Putnam, CT (US)

( * ) Notice: Subject to any disclaimer, the term of this patent is extended or adjusted under 35 U.S.C. 154(b) by 232 days.

(21) Appl. No.: 12/102,653

(22) Filed: Apr. 14, 2008

(65) Prior Publication Data

US 2009/0257941 A1    Oct. 15, 2009

(51) Int. Cl.
 *C01B 31/20* (2006.01)
 *B01J 8/08* (2006.01)
 *F23D 14/00* (2006.01)
 *F23J 11/00* (2006.01)
 *F23J 15/00* (2006.01)

(52) U.S. Cl. ..... 423/438; 110/345; 422/232; 423/437.1; 431/5

(58) Field of Classification Search ................ 110/345; 423/438, 437.1; 431/5; 422/232
See application file for complete search history.

(56) References Cited

U.S. PATENT DOCUMENTS

| | | | |
|---|---|---|---|
| 4,213,935 A * | 7/1980 | Goodnight et al. | ........... 422/111 |
| 4,309,398 A | 1/1982 | Sheth | |
| 4,607,179 A | 8/1986 | Dooley et al. | |
| 4,718,361 A * | 1/1988 | Berry | ............... 110/345 |
| 4,917,874 A | 4/1990 | Sheth et al. | |
| 5,055,724 A | 10/1991 | Berry | |
| 5,057,294 A | 10/1991 | Sheth et al. | |
| 5,234,183 A | 8/1993 | Hammer | |
| 6,148,599 A | 11/2000 | McIntosh et al. | |
| 6,202,574 B1 | 3/2001 | Liljedahl et al. | |
| 7,069,867 B2 | 7/2006 | Marin et al. | |
| 2006/0129020 A1 | 6/2006 | Barends | |
| 2007/0232706 A1 | 10/2007 | Shah et al. | |

OTHER PUBLICATIONS

Sangras et al., "Demonstration of a New Combined NOx and SOx Removal Retrofit Technology for Coal-Fired Boilers," Twenty Second Annual International Pittsburgh Coal Conference, Sep. 12-15, 2005.

Wilkinson et al., "CO2 Capture via Oxyfuel Firing: Optimization of a Retrofit Design Concept for a Refinery Power Station Boiler." First National Conference on Carbon Sequestration, May 17, 2001.

International Preliminary Report on Patentability and Written Opinion of the International Searching Authority, dated Oct. 19, 2010 and mailed on Oct. 28, 2010 for International Application Serial No. PCT/US2009/40095.

* cited by examiner

*Primary Examiner* — Kiley Stoner
*Assistant Examiner* — Alexander Polyansky
(74) *Attorney, Agent, or Firm* — McAndrews, Held & Malloy, Ltd.

(57) ABSTRACT

A pulverized coal/coke (PC) boiler combusts carbon-based fuel with substantially pure oxygen and a flue gas recirculation stream (containing predominately carbon dioxide) at varied ratios to achieve a desired boiler temperature profile while producing captured sulfur, a high purity captured $CO_2$ and electric power. The boiler includes at least one of (a) a mechanism for admixing a pulverized solid carbon-based fuel with an alkali metal salt and (b) injecting alkali metal salt into the boiler combustion zone containing a pulverized solid carbon-based fuel.

18 Claims, 5 Drawing Sheets

Comparative Combustion Testing Results

| Technique tested | CA Coke 1.4% S (S ppm) | CA Coke 3.3 % N$_2$ (N$_2$ ppm) | IL #6 Coal 2.7 %S (S ppm) | IL #6 Coal 1.5% N$_2$ (N$_2$ ppm) |
|---|---|---|---|---|
| Uncontrolled | 1,011 | 2,414 | 1,974 | 1,119 |
| CFB - one pass air | 647 | 2,148 | 1,263 | 996 |
| CFB - one pass oxygen | 404 | 2,679 | 789 | 1,242 |
| CFB - multiple pass to 98% | 20 | 1,468 | 39 | 724 |
| PC – one pass air | 0.8 | 251.0 | 2.2 | 116.2 |
| PC – one pass with CO$_2$ capture | 0.0 | 0.0 | 0.0 | 0.0 |

Pulverized Coal/Coke Boiler K$_2$CO$_3$ Results
Burner Flow Reactor Test Results for IL #6 Coal

| Measured Values | Uncontrolled Emission | Center Line (CL) | 30 cm from CL | 20 cm from CL | 10 cm from CL | Average |
|---|---|---|---|---|---|---|
| Nitrogen Oxide (ppm) | 1,119 | 143 | 111 | 122 | 62 | 110 |
| Sulfur Oxide (ppm) | 1,974 | 3.5 | 2.6 | 2.0 | 0.7 | 2.2 |
| Carbon Monoxide (ppm) | --- | 322 | 187 | 142 | 57.3 | 177 |
| Carbon Dioxide (mole %) | --- | 10.8 | 11.2 | 11.1 | 10.5 | 10.9 |
| Oxygen (mole %) | --- | 1.9 | 1.4 | 1.7 | 2.2 | 1.8 |

Figure 5

Pulverized Coal/Coke Boiler $K_2CO_3$ Results
Burner Flow Reactor Test Results for CA Petroleum Coke

| Measured Values | Uncontrolled Emission | Center Line (CL) | 30 cm from CL | 20 cm from CL | 10 cm from CL | Wall | Average |
|---|---|---|---|---|---|---|---|
| Nitrogen Oxide (ppm) | 2,414 | 239 | 252 | 261 | 253 | 254 | 251 |
| Sulfur Oxide (ppm) | 1,011 | 0.7 | 0.8 | 0.6 | 0.5 | 0.6 | 0.7 |
| Carbon Monoxide (ppm) | --- | 16.3 | 13 | 14 | 26 | 120 | 17 |
| Carbon Dioxide (mole %) | --- | 11.1 | 10.7 | 11 | 10.83 | 10.94 | 10.9 |
| Oxygen (mole %) | --- | 1.7 | 1.8 | 1.82 | 2.05 | 1.95 | 1.8 |

COAL/COKE/HEAVY RESIDUAL OIL BOILER WITH SULFUR AND CARBON DIOXIDE CAPTURE AND RECOVERY

FIELD OF THE INVENTION

The present disclosure relates to a steam boiler for generating electrical power from a high sulfur-containing carbon-based fuel. In particular, the present disclosure relates to a coal/coke/heavy residual oil steam boiler in which the fuel is combusted to produce power, steam, alkali metal sulfates from the sulfur in the fuel and carbon dioxide ($CO_2$), the latter two of which are captured and recovered with essentially no further emissions under normal operating condition. The non-emissive steam boiling plant, when operated commercially, will have little or no greenhouse gas (GHG) emission.

BACKGROUND OF THE INVENTION

Carbon-based fuels are used as combustion fuels for steam boilers. The boilers make steam to drive steam turbines in power generation plants. The turning of the steam turbines produces power. Conventional steam boilers burn fuel in the presence of air to form steam that can be used to drive a steam turbine. Typical steam boiler fuels include natural gas, petroleum, char, coke, heavy residual oil and coal (fossil fuels). When these carbon-based fuels are combusted in the presence of air they produce flue gas that is mostly nitrogen ($N_2$), $CO_2$ and lesser amounts of water vapor, with small quantities of material to be reduced, such as nitrogen oxides ($NO_x$), sulfur oxides ($SO_x$) and particulate matter.

$NO_x$ and $SO_x$ gases that are released into the atmosphere cause environmental pollution and are currently regulated. $CO_2$ is considered a GHG and $CO_2$ emissions are also proposed to be regulated. Recently the government has lowered the emission level allowed on $NO_x$ and $SO_x$ and has proposed reducing permitted $CO_2$ emission levels.

There are varied $CO_2$ capture techniques being proposed for steam boiler units, where $CO_2$ is captured using various absorber scrubber systems (polar solvent based systems) that act on the cooler effluent flue gas stream. None of these $CO_2$ absorber techniques for steam boiler units are believed to be capable of capturing $CO_2$ with essentially no further atmospheric emissions.

Conventional steam boiler units have generally succeeded at producing electrical power, but require significant operating and capital expense to recover and capture $CO_2$. Moreover, conventional steam boiler units generally use large amounts of energy to product electric power. In addition, $CO_2$ capture with zero emissions has not been attempted successfully in conventional steam boiler units.

In conventional fossil fuel steam boiler units, the sulfur in combusted fuel forms $SO_x$ in the flue gas. The $SO_x$ is typically recovered using various techniques such as: (1) circulating fluidized bed (CFB) systems where calcium carbonate ($CaCO_3$) is reacted with the $SO_x$ to form calcium sulfate ($CaSO_4$), or (2) flue gas desulfurization (FGD) reactant systems using magnesium carbonate ($MgCO_3$) or $CaCO_3$ to recover the sulfur in the flue. These techniques usually recover 90% to 98% sulfur in fuel and represent significant operating and capital equipment costs.

SUMMARY OF THE INVENTION

Certain embodiments of the presently described technology provide steam boiler(s) for generating electrical power from a high sulfur-containing carbon-based fuel.

In one embodiment, the present method of operating a coal/coke/heavy residual oil steam boiler produces substantially pure carbon dioxide with low nitrogen oxide, sulfur oxide and water concentrations. The method comprises:
  (a) admixing a carbon-based fuel with an alkali metal compound;
  (b) combusting the carbon-based fuel with a substantially pure oxygen stream and a flue gas recirculation stream, the recirculation stream containing predominately carbon dioxide; and
  (c) varying the mass flow ratios of the oxygen and recirculation streams such that a desired boiler temperature profile and substantial $NO_x$ reduction is achieved.

In a preferred embodiment of the foregoing method, the carbon-based fuel can be a pulverized solid carbon-based fuel such as coal, petroleum coke, and/or char or it can be heavy residual oil fractions. The alkali metal compound can be potassium carbonate ($K_2CO_3$). The substantially pure carbon dioxide can have a nitrogen oxide concentration of less than 100 ppm, a sulfur oxide concentration of less than 50 ppm, an oxygen concentration of less than 100 ppm and/or a water concentration of less than 100 ppm.

In another embodiment, the present method of operating a coal/coke/heavy residual oil steam boiler produces substantially pure carbon dioxide with low nitrogen oxide, sulfur oxide and water concentrations, and comprises:
  (a) combusting a carbon-based fuel with a substantially pure oxygen stream and a flue gas recirculation stream in a combustion zone, the recirculation stream containing predominately carbon dioxide;
  (b) injecting an alkali metal salt into the combustion zone containing the carbon-based fuel; and
  (c) varying the mass flow ratios of the oxygen and recirculation streams such that a desired boiler temperature profile and mass flow profile are achieved.

In a preferred embodiment of the foregoing method, the carbon-based fuel can be a pulverized solid carbon-based fuel such as coal, petroleum coke and/or char, or it can be heavy residual oil fractions. The alkali metal compound can be $K_2CO_3$. The substantially pure carbon dioxide can have a nitrogen oxide concentration of less than 100 ppm, a sulfur oxide concentration of less than 50 ppm, an oxygen concentration of less than 100 ppm and/or a water concentration of less than 100 ppm.

One embodiment of the present coal/coke/heavy residual oil boiler produces substantially pure carbon dioxide with low nitrogen oxide, sulfur oxide and water concentrations. The boiler comprises:
  (a) a combustion region for combusting a carbon-based fuel with a substantially pure oxygen stream and a flue gas recirculation stream, the recirculation stream containing predominately carbon dioxide;
  (b) at least one of: (i) a mechanism for admixing the carbon-based fuel with an alkali metal salt, and (ii) injecting alkali metal salt into the combustion region containing the carbon-based fuel; and
  (c) a mechanism for varying the stoichiometric ratios of the oxygen and recirculation streams such that a desired boiler temperature profile is achieved.

In a preferred embodiment of the boiler, the carbon-based fuel can be a pulverized solid carbon-based fuel such as coal, petroleum coke, char and heavy residual oil fractions. The alkali metal compound can be $K_2CO_3$. The substantially pure carbon dioxide can have a nitrogen oxide concentration of less than 100 ppm, a sulfur oxide concentration of less than 50 ppm, an oxygen concentration of less than 100 ppm and/or a water concentration of less than 100 ppm.

In a preferred embodiment of the foregoing improved boiler, the carbon-based fuel can be a pulverized solid carbon-based fuel such as coal, petroleum coke, char and heavy residual oil fractions. The alkali metal compound can be $K_2CO_3$. The substantially pure carbon dioxide can have a nitrogen oxide concentration of less than 100 ppm, a sulfur oxide concentration of less than 50 ppm, an oxygen concentration of less than 100 ppm and/or a water concentration of less than 100 ppm.

Another embodiment of the present coal/coke/heavy residual oil boiler for producing substantially pure carbon dioxide with low nitrogen oxide, sulfur oxide and water concentrations, comprises:
  (a) a boiler unit having an inlet for a carbon-based fuel, an inlet for a flue gas recirculation stream, an inlet for an oxidant stream and an inlet for an alkali metal salt;
  (b) an oxidant heater fluidly connected to said boiler unit;
  (c) a particulate recovery unit fluidly connected to said oxidant heater wherein said particulate recovery unit recovers a sulfur product;
  (d) a flue gas recirculation loop connecting said particulate recovery unit to said inlet for said flue gas recirculation stream on said boiler unit; and
  (e) a carbon dioxide recovery unit fluidly connected to said flue gas recirculation loop wherein said carbon dioxide recovery unit recovers a carbon dioxide product.

In one embodiment a flue gas stream exits the boiler unit and enters the oxidant heater. In that embodiment the flue gas stream also exits the oxidant heater and enters the particulate recovery unit. The flue gas stream also exits the particulate recovery unit and enters the flue gas recirculation loop to the boiler unit.

In one embodiment the flue gas is carbon dioxide. In another embodiment the flue gas is substantially pure carbon dioxide.

In one embodiment the alkali metal salt is potassium carbonate.

The inlet for the oxidant stream and the inlet for the flue gas stream can be combined. Similarly, the inlet for the alkali metal salt and the inlet for the carbon-based fuel can be combined.

In one embodiment the boiler unit is further connected to a power generation unit via a steam turbine.

In one embodiment the oxidant heater has an inlet for an oxidant stream and an outlet for a heated oxidant stream. In this embodiment, an oxidant pipe fluidly connects the inlet for an oxidant stream of the oxidant heater to an air separation unit. Ambient air enters the air separation unit and substantially pure oxygen exits the air separation unit into the oxidant pipe. The flue gas recirculation loop can be fluidly connected to the oxidant pipe.

In one embodiment the particulate recovery unit is an ESP. In another embodiment it is a bag house.

In one embodiment, the carbon dioxide recovery unit can comprise a pre-cooler, a drier and a carbon dioxide conditioner.

In one embodiment the sulfur product is substantially pure. In another embodiment the carbon dioxide product is substantially pure.

DETAILED DESCRIPTION OF PREFERRED EMBODIMENT(S)

The present technology relates to coal/coke/heavy residual oil steam boilers and methods of operating such steam boilers. Certain embodiments provide essentially complete carbon capture from solid and liquid fuels when generating steam in a boiler.

Certain embodiments of the presently described boiler utilize oxygen ($O_2$) and carbon dioxide ($CO_2$) recirculation with alkali metal compounds such as potassium carbonate ($K_2CO_3$) introduced such that during the combustion process a high quality $CO_2$ is produced and the need for a further concentration step is alleviated when used in connection with carbon capture or sequestration. An oxygen scavenging step can be added for enhanced oil recovery (EOR) uses. With little or no nitrogen ($N_2$) in the oxidant the resultant $CO_2$ has a high concentration and the resultant captured $CO_2$ has low nitrogen oxides ($NO_x$) and ultra low sulfur oxides ($SO_x$).

Certain embodiments of the presently described method include chemical process burning with high purity $O_2$ and $CO_2$ recirculation where sulfur and nitrogen are recovered and the carbon is oxidized as $CO_2$.

Certain embodiments of the presently described steam generation boilers capture $CO_2$ thereby making a non-emissive boiler. The sulfur and ash in the fuel are recovered as solids The recovered potassium sulfates ($K_2SO_4$) and potassium nitrates ($KNO_3$) when recovered from ash can be used as a fertilizer.

The present coal/coke/heavy residual oil steam boiler produces directly recoverable, high-purity $CO_2$ and sulfur products, steam and/or electric current from a single integrated unit combusting fossil (carbon-based) fuel. Under normal operating conditions there are essentially zero emissions from the present steam generation boiler. The present steam boiler employs an economical approach to produce electrical power at steam cycle efficiencies that are greater than conventional boiler units. The present steam boiler simultaneously captures and recovers $CO_2$ with low $NO_x$ and ultra low $SO_x$ concentrations and with substantially no further atmospheric emissions or zero emissions.

The present steam boiler also produces a directly recoverable, high-purity $K_2SO_4$ product that can be used as a fertilizer. The present steam generating boiler employs an economical approach to produce electrical power at steam cycle efficiencies that are greater than conventional, boiler units. The present steam boiler simultaneously captures $CO_2$ and recovers a large portion of the sulfur from the fossil fuel.

In the present coal/coke/heavy residual oil steam boiler the carbon-based fuel is combusted with substantially pure $O_2$ and a flue gas recirculation stream (containing predominately $CO_2$) at varied ratios to achieve the desired steam boiler temperature profile and mass flow profile. This is done while producing a high purity captured $CO_2$ with low $NO_x$ and ultra low $SO_x$ concentrations while producing steam and/or electric current. The preferred carbon-based fuels include coal, petroleum coke, heavy residual oils and/or char.

In the present coal/coke/heavy residual oil steam boiler the carbon-based fuel is either premixed with an alkali metal salt or the alkali metal salt is injected by a separate mechanism into the combustion zone to capture sulfur from the combustion products by a chemical reaction. An example of a suitable alkali metal compound is potassium carbonate ($K_2CO_3$) or other potassium compounds. The $K_2CO_3$ is added in a potassium to sulfur stoichiometric ratio of at least about 1:1 to react with the sulfur in the fuel. The alkali metal compound such as $K_2CO_3$, has a very fast reaction rate and has very high selectivity to form the $K_2SO_4$. The present technique provides significantly higher-yield sulfur removal than known techniques.

The present coal/coke/heavy residual oil steam boiler produces high purity captured $CO_2$ with low water, $NO_x$, $SO_x$ and $O_2$ concentrations. This high quality $CO_2$ can be utilized for enhanced oil recovery as required in their $CO_2$ specifications. Exemplary implementations of the present coal/coke/heavy residual oil steam boiler will now be described in connection with FIG. 1.

Figure 1:
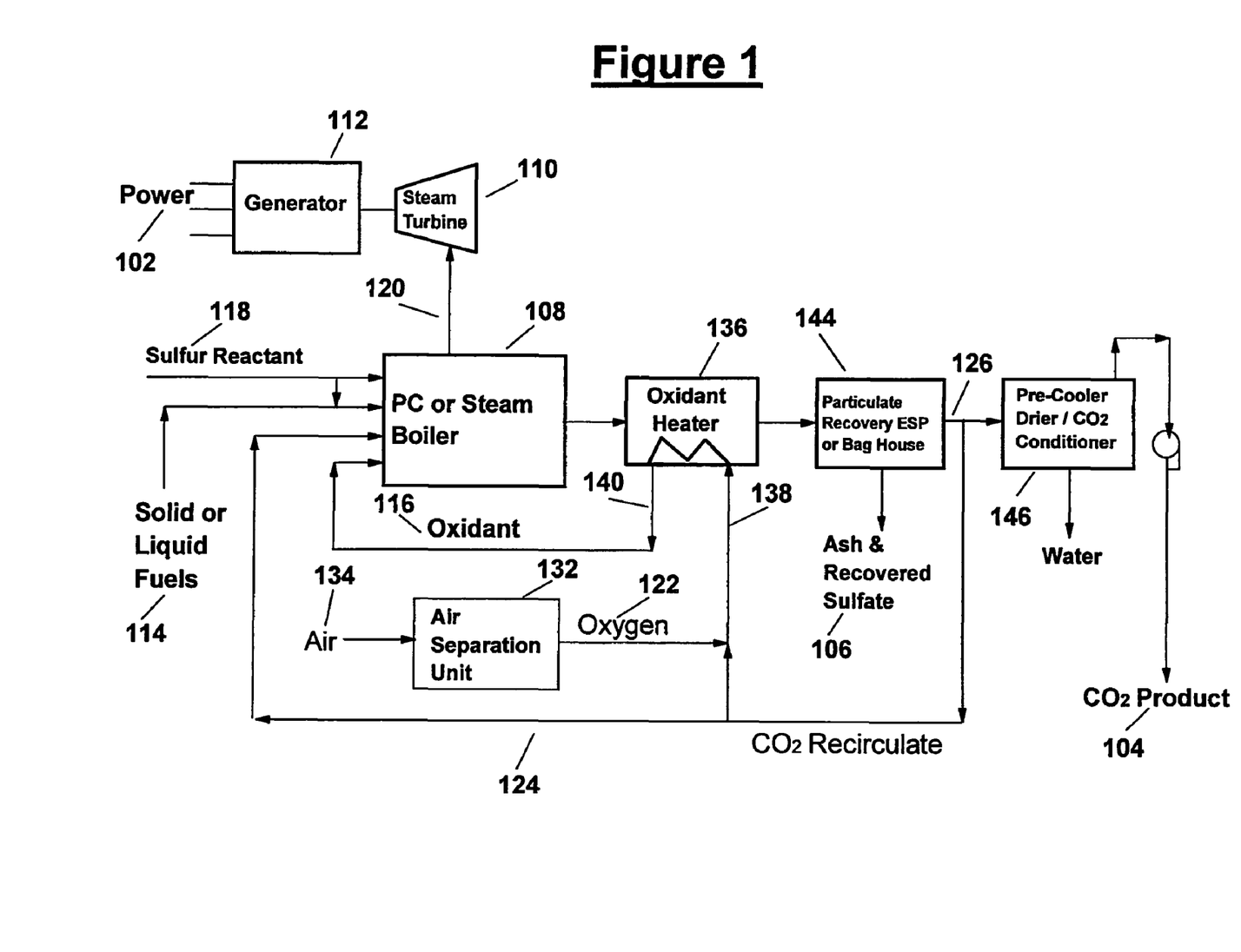
FIG. 1 is a schematic flow diagram illustrating one embodiment of the present coal/coke/heavy residual oil steam boiler with sulfur and $CO_2$ capturing capability.

FIG. 1 illustrates an embodiment of the present steam boiler, in which a combustion device produces both generated electric current 102, a captured $CO_2$ product stream 104 with low water, $NO_x$ and $SO_x$ concentrations, and recovered sulfur in the form of a potassium sulfate and ash 106.

As shown in FIG. 1, the steam boiler includes a power generating subsystem and special components that facilitate the production of $CO_2$ 104 with low water, $NO_x$ and $SO_x$ concentrations. The power generating subsystem of the steam boilers illustrated in FIG. 1 consists of a steam generating coal/coke/heavy residual oil steam boiler 108, a steam turbine 110 and a power generator 112. Combustion of a fossil fuel 114 (carbon-based fuels) such as coal, char, heavy residual oil or petroleum coke, takes place in the radiant section of the steam boiler 108. The chemical energy of the fuel is converted to thermal energy. The thermal energy is then used to generate steam to drive the turbine 110.

The fossil fuels 114 are combusted in the radiant section of a steam boiler 108 to operate the power generator 112. Combustion within the furnace of the steam boiler 108 creates a hot combustion gas. The combustion gas is used to heat circulating water in hot water exchanger tubes. The water is converted into high-pressure steam, which exits to and drives the steam turbine 110.

A solid or liquid feed delivery system line is used to transport the fuel 114 into a solid fuel feeder hopper or liquid feed vessel (not shown). An environment of recirculated flue gas (primarily $CO_2$) is maintained, in the solid fuel feeder hopper or liquid feed vessel. If solid fuel is used, the fuel flows at a controlled rate from the solid fuel feeder hopper to a pulverizer unit where the solid fuel is pulverized. The pulverized or liquid fuel is then carried from the pulverizer or liquid feed vessel to the combustion burners by a hot combustion gas stream. The liquid fuel vessel could be operated with a $CO_2$ cover to prevent oxidation.

The pulverized solid is carried to the combustion burners by the hot combustion gas stream. Liquid fuel will be transported by a suitable pumping system. The pulverized solid or liquid fuel 114 is mixed with the heated oxidant 116, as described below. The solid or liquid fuel 114 is fired in the steam boiler 108. The pulverized solid or liquid fossil fuels 114 are combusted in the steam boiler 108. The hot combustion gas then passes through the steam boiler 108, transferring heat to water in the boiler tubes, thereby creating steam. Later stages of the steam generator typically include a horizontal gas pass, back pass and varied provisions of economizers, superheaters and reheaters.

The sulfur in the fuel reacts with a sulfur reactant 118, such as an alkali metal compound. In one embodiment, potassium carbonate ($K_2CO_3$) is used. When combusted with the fuel-bound sulfur the $K_2CO_3$ forms potassium sulfate ($K_2SO_4$). The sulfur reactant 118, often an alkali metal compound, can be admixed with the carbon-based fuel 114 or injected into the combustion region containing the carbon-based fuel. The $K_2CO_3$ is added in a potassium-to-sulfur stoichiometric ratio of at least about 1:1 to react with the sulfur in the fuel. This can be compared to the 4:1 calcium-to-sulfur ration that is used with $CaCO_3$.

The power generator 112 is driven by a steam turbine 110 for generating electric current 102. The steam is converted to mechanical energy used in driving the steam turbine 110, thereby creating a combined cycle system in which the products are electric current 102 and $CO_2$. Steam is transported from the boiler 108 to the steam turbine 110 via a line 120 thereby driving the steam turbine 110 and the power generator 112.

The $CO_2$ is produced by combusting the fossil fuels 114 in the presence of an oxidant 116. The oxidant 116 is a controlled mixture of nearly pure $O_2$ 122 and possibly a small flow of recirculated flue gas 124. Nearly pure $O_2$ has from about 98 to about 99.5 percent purity, alternatively from about 95 to about 100 percent purity.

The oxidant 116 is made up of about 27 to about 30 percent mole fraction of nearly pure $O_2$ 122, alternatively about 25 to about 40 percent mole fraction of nearly pure $O_2$ 122, or alternatively in excess of about 25 percent mole fraction. The remaining recirculated flue gas 124 is introduced separately into the boiler to produce desired temperature and mass flow profiles of combustion gas. The flue gas is thereby mostly pure $CO_2$. Varying the ratio of flue gas to oxidant allows the user to control the temperature in the radiant section of the boiler 108. This allows a user to maintain a desired boiler temperature profile in the boiler. The desired boiler temperature is determined by the physical capabilities of the boiler. Pure oxygen would create temperatures so high that the metal that makes up the boiler would melt. A user can determine a desired temperature profile by determining the temperature capability of the boiler. The flue gas to oxidant ratio can then be varied to achieve the desired temperature.

Using nearly pure $O_2$ 122 and recirculated flue gas 124 creates an exiting flue gas that is essentially pure $CO_2$ 126 with low $NO_x$ and $SO_x$ concentrations and water vapor. A flue gas 126 comprising essentially $CO_2$ with low $NO_x$ concentration has a $NO_x$ concentration of less than about 100 parts per million (ppm), alternatively between about 10 and about 90 ppm. $NO_x$ can be controlled/reduced by both chemical reactions with $K_2CO_3$ and with staged oxygen injection following the radiant section of the boiler. A $CO_2$ flue gas with low $SO_x$ concentration has a $SO_x$ concentration of less than about 50 ppm, alternatively between about 10 and about 40 ppm.

The flue gas 126 can be dried using conventional techniques to obtain a low water concentration. $CO_2$ flue gas with a low water concentration has a water concentration of less than about 100 ppm, alternatively between about 10 and about 90 ppm. The pure $CO_2$ flue gas 126 also has low oxygen $O_2$.

A flue gas 126 with low $O_2$ concentration has an $O_2$ concentration of less than about 100 ppm, alternatively between about 10 and about 90 ppm.

A flue gas of pure $CO_2$ 128 with low $NO_x$, $SO_x$ and water concentrations allows purity specifications for subsequent geological sequestration, EOR, enhanced coal bed methane (ECBM) and other purposes.

As shown in FIG. 1, the exiting $CO_2$ flue gas is divided into a product stream 104 and a flue gas recirculation stream 124 that goes to the flue gas recirculation system A fraction of flue gas in the flue gas recirculation system 124 is mixed with oxygen from an oxygen stream 122. The flue gas and oxygen combine to form an oxidant stream 116 that is used during combustion. The remaining flow of recirculated flue gas is introduced into the boiler to control combustion gas temperature and flow profiles in the steam boiler.

$O_2$ is supplied by an air separation unit or ASU 132, which separates $O_2$ from ambient air 134. The ASU 132 can be a cryogenic plant that produces $O_2$ at a high purity or other economical air separation device, such as a membrane system. The $O_2$ is preheated in a pre-combustion heater 136 having a cold side inlet line 138 and a heated exit line 140. A fraction of the recirculated $CO_2$ from the flue gas recirculation system 124 and $O_2$ from the ASU 132 combine to form an oxidant stream 116. The oxidant stream 116 is transported via a piping manifold system into the steam boiler 108.

The oxidant could be added at various points along the steam boiler 108 to create staged combustion. In one embodiment the oxidant is added through primary and secondary combustion gas injection nozzles into the steam boiler 108. This is a method to control or reduce the $NO_x$ formation in the flue gas.

The primary combustion burner $O_2$ level can be metered using a controller. The levels can be adjusted to a higher $CO_2$ ratio (content) in the $CO_2/O_2$ ratio followed downstream by a higher $O_2$ ratio in $CO_2/O_2$ steam. Adjusting the ratio allows the user to reduce the formation of $NO_x$ as shown in the piping manifold system.

The two largest components of the flue gas exiting the back pass 142 of the boiler 108 are $CO_2$ and water vapor. The captured $CO_2$ product and flue gas recirculation system can also include, as shown in FIG. 1, an electrostatic precipitator (ESP) or a bag house 144. In operation, the ESP or bag house 144 removes condensed solids material contained in flue gas by using commercially available devices. For example, the alkali metal sulfate and nitrates, such as $K_2SO_4$ and $KNO_3$ can be recovered in the ESP or bag house 144 as a recovered ash and potassium sulfate 106. The $K_2SO_4$ 106 can then be used and marketed as a fertilizer.

After exiting the ESP or bag house 144, the movement of the flue gas can be aided by the operation of conventional induced fans located within the flue gas flow stream.

After exiting the ESP or bag house 144, the flue gas then enters a gas cooler and $CO_2$ drier/$CO_2$ conditioner 146. If desired, the movement of the flue gas can be aided by the operation of conventional induced fans located within the flue gas flow stream. The gas cooler and $CO_2$ drier/$CO_2$ conditioner 146 removes large quantities of the water vapor in flue gas duct and prepares the $CO_2$ for commercial use and/or sequestration. Although not shown in the figures, the gas cooler and $CO_2$ drier/$CO_2$ conditioner 146 can be used to heat the cool boiler feed water line in series with other feedwater heaters that can exist in line within the regenerative steam cycle facility.

The flue gas exiting the gas cooler and $CO_2$ drier/$CO_2$ conditioner 146 is a high purity $CO_2$ product 104 that can be sold or used for sequestration. The $CO_2$ product can be used for subsequent geological and submarine sequestration. The $CO_2$ product 104 can be further conditioned to remove water and trace $O_2$ from the stream depending on the quality requirements. The $CO_2$ product 104 of the flue gas can be used in commercial operations, such as, for example, EOR and/or ECBM, which may require the low $O_2$, $SO_x$, $NO_x$ and water concentrations described above. The captured $CO_2$ product gas 104 can be supercritically compressed for EOR application to a pressure sufficient to liquefy the $CO_2$. Compression can extract further water vapor from the flue gas.

The remaining portion of the flue gas (predominately $CO_2$) is recirculated to the steam generator 108 and the oxygen stream 122 via a blower. A fraction of the recirculated flue gas 124 is combined with the substantially pure $O_2$ to form the oxidant stream 116. The remainder of the recirculated flue gas 124 is introduced into the steam boiler 108 to achieve desired temperature and mass flow profiles throughout the steam boiler 108. The oxidant is ultimately used in the radiant section of the steam boiler 108 with small quantities of nitrogen present coming from the ASU 132. There is a higher $O_2$ purity when there is less nitrogen present in the $CO_2$ stream.

Most solid fuels and heavy residual oils contain sulfur, so without the introduction of an alkali metal, the captured $CO_2$ product will also contain a level of $SO_x$ and $NO_x$ that can exceed the maximum limit specified for EOR and ECBM, $CO_2$ sequestration or other applications. $SO_x$ concentration can be reduced to a desired level by adding an alkali metal, such as $K_2CO_3$, to the combustion zone of the steam boiler 108. The sulfur in the solid fuel preferentially reacts with the alkali metal to form an alkali sulfate. For example, $K_2CO_3$ can react with sulfur to form a $K_2SO_4$. The alkali metal can be added into the combustion stream in the steam boiler 108 or added directly to the fuel 114. The alkali metal sulfate, such as $K_2SO_4$, is recovered in the particulate recovery area, the ESP or bag house 144 as a recovered ash and potassium sulfate, potassium nitrate product 106. The $K_2SO_4$ can be used and marketed as a fertilizer or can be regenerated to form $K_2CO_3$, which is re-injected into the combustion stream in the steam boiler 108.

The present method also involves the steps of: (i) dividing the flue gas into a captured $CO_2$ product stream 104 and a recycling stream 124 through simple recovery, (ii) cooling and compressing the end product stream of the flue gas so as to yield carbon dioxide in a high concentration for other uses, and (iii) recirculating a fraction of the flue gas to the boiler 108 to contribute to the combustion and cooling process therein.

As shown in FIG. 1 the current coal/coke/heavy residual oil boiler for producing substantially pure carbon dioxide with low nitrogen oxide, sulfur oxide and water concentrations comprises a boiler unit 108. The boiler unit 108 has an inlet for a carbon-based fuel such as coal, char, heavy residual oil or petroleum coke. There is also an inlet for an alkali metal salt such as potassium carbonate. The inlets for the alkali metal salt and the carbon-based fuel can be combined into a single inlet.

The boiler unit 108 additionally has an inlet for a flue gas recirculation stream. The flue gas recirculation stream is typically a substantially pure carbon dioxide stream, having low nitrogen oxide, sulfur oxide and water concentrations. The boiler unit 108 also has an inlet for an oxidant stream. Oxygen can be used as an oxidant. The inlet for the oxidant stream and the inlet for the flue gas stream can be combined into a single inlet. The boiler temperature can be controlled as described above by varying the mole ratio of flue gas and oxidant in the boiler unit 108.

The carbon-based fuel enters the boiler unit 108 and is combusted. In one embodiment the boiler unit 108 is further connected to a power generation unit 112 via a steam turbine 110. The combustion of the carbon-based fuel creates steam. The steam operates the turbine 110 which operates the power generator 112 to create electric current 102.

A flue gas stream also exits the boiler unit 108 and enters an oxidant heater 136 that is fluidly connected to the boiler unit 108. The flue gas stream proceeds through the oxidant heater 136 and out of a flue gas outlet in the oxidant heater 136. In one embodiment the oxidant heater also has an inlet for an oxidant stream and an outlet for a heated oxidant stream. In this embodiment, an oxidant pipe fluidly connects the inlet for an oxidant stream of the oxidant heater to an air separation unit 132. Ambient air 134 enters the air separation unit 132 and substantially pure oxygen exits 122 the air separation unit into the oxidant pipe.

The flue gas stream that exits the oxidant heater 136 then enters a particulate recovery unit 144 that is fluidly connected to the oxidant heater 136. The particulate recovery unit 144 recovers a sulfur product 106 and ash. In one embodiment the sulfur product is substantially pure. The sulfur product can be utilized as fertilizer. In one embodiment the particulate recovery 144 unit is an ESP. In another embodiment it is a bag house.

The flue gas stream then exits the particulate recovery unit 144 and enters the flue gas recirculation loop 124 to the boiler unit 108. The flue gas recirculation loop 124 connects the particulate recovery unit 144 to the inlet for the flue gas recirculation stream on the boiler unit 108. In one embodiment the flue gas recirculation loop 124 can be fluidly connected to the oxidant pipe, so that a portion of the flue gas is combined with the oxidant stream.

The portion of the flue gas not entering the flue gas recirculation loop 124 enters the carbon dioxide recovery unit 146. The carbon dioxide recovery unit 146 is fluidly connected to the flue gas recirculation loop 124. The carbon dioxide recovery unit recovers a carbon dioxide product 104, which can be a substantially pure carbon dioxide product. In one embodiment, the carbon dioxide recovery unit can comprise a precooler, a drier and a carbon dioxide conditioner.

In the present steam boiler, essentially no flue gas components are released to the atmosphere. Results achievable by the present steam boiler include: the production of high purity $CO_2$, the production of steam for electric power at a low cost, the production of steam for cogen applications, the production of substantially zero atmospheric emissions under normal operation, the production of a commercially viable fertilizer base, and the use of inexpensive, readily available fuels.

Test Results

Figure 2:
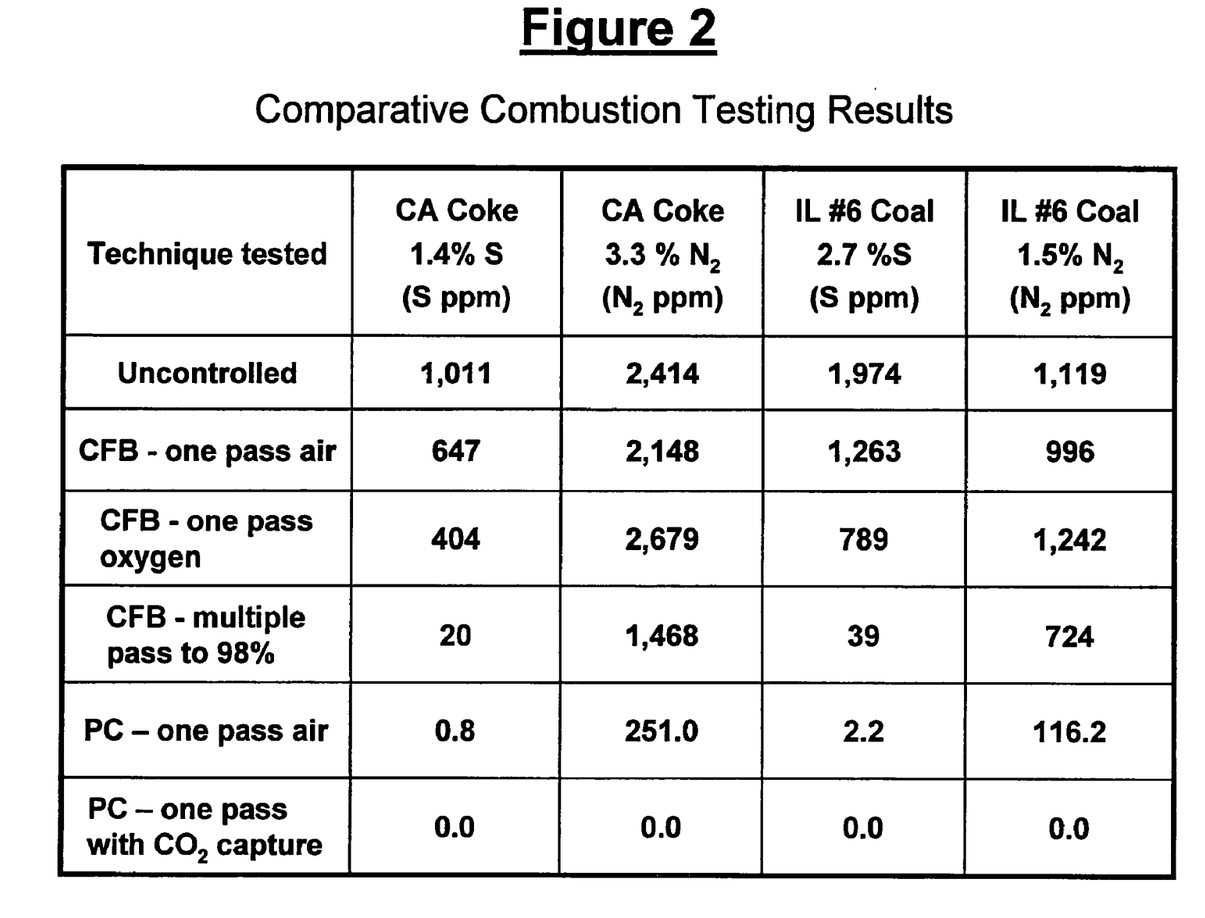
FIG. 2 is a table comparing sulfur and nitrogen concentrations for a circulating fluidized bed (CFB) boiler with $CaCO_3$ as compared to a pulverized coal/coke (PC) boiler with $K_2CO_3$.

Both the previously available circulating fluidized bed (CFB) boiler system using calcium carbonate ($CaCO_3$) and the applicant's pulverized coal/coke (PC) boiler or steam boiler with potassium carbonate ($K_2CO_3$) were analyzed on a comparable basis. These two systems results are then compared in FIG. 2.

Both systems were tested using California (CA) petroleum coke and Illinois #6 coal. The CA petroleum coke was comprised of approximately 1.4% sulfur and approximately 3.3% nitrogen. The Illinois #6 coal was comprised of approximately 2.7% sulfur and 1.5% nitrogen.

CFB data based on once-through results from a 4-inch fluid bed combustor are provided using a single pass of both air and oxygen. The facility is a once-through reactor with a gas residence time of approximately 1.5 seconds, compared to a commercial CFB gas residence time of about 5 seconds. Multiple-pass results are also provided. The fuel particles were circulated in the loop until desulfurization of 98% was achieved upon multiple loop circulations.

The pulverized coke with $K_2CO_3$ when combusted with air in a single-pass results in a calculated 99.9% sulfur recovery using the estimated value of 1.69 pounds/MMBTU in the raw CA petroleum coke. The coal and coke/$K_2CO_3$ combustion test results measured illustrate a high sulfur and nitrogen removal with the $K_2CO_3$ sorbent. These data are with air combustion and supplemental natural gas firing to achieve substantially complete combustion of the coke. The oxy-fuel fired with $K_2CO_3$ has a 30% $O_2$ content (which is similar to the CFB at 30%) and the initial results $SO_x$ emission level is substantially lower when operating as an air emission basis. It is thought that $NO_x$ emission reduction is the net effect of nitrogen and potassium in the combustion gas reacting to form $KNO_3$. $NO_x$ emission is affected by the flame temperature, pressure, stoichiometry and cool down rate. Staged combustion was used and proved quite effective.

Figure 3:
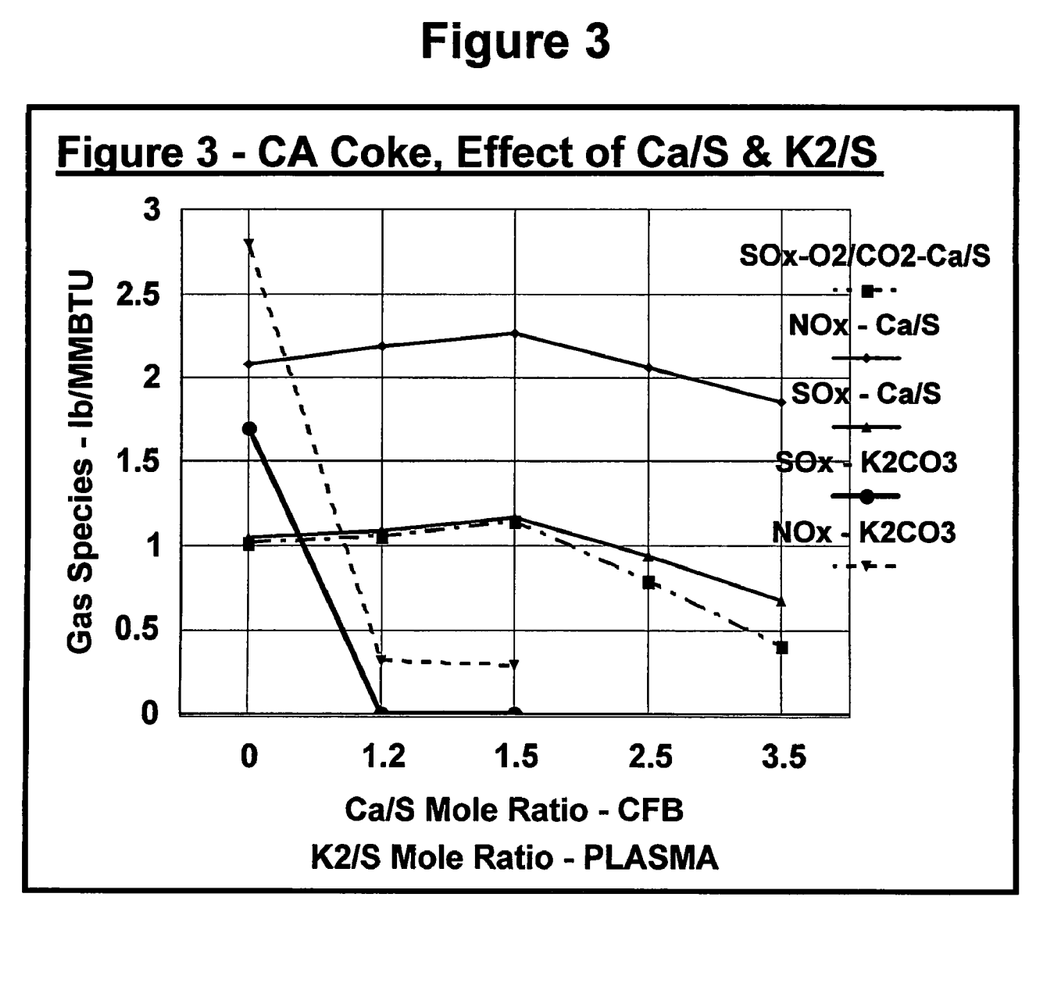
FIG. 3 is a comparative plot of gas species recovery as a function of mole ratio for a circulating fluidized bed (CFB) boiler with $CaCO_3$ and a pulverized coal/coke (PC) boiler with $K_2CO_3$.

Results of CFB boiler with $CaCO_3$ and the applicant's PC boiler with $K_2CO_3$ are compared in the plot set forth in FIG. 3. The data represented in the table in FIG. 2 and the plot in FIG. 3 were calculated to be on the same basis.

Figure 4:
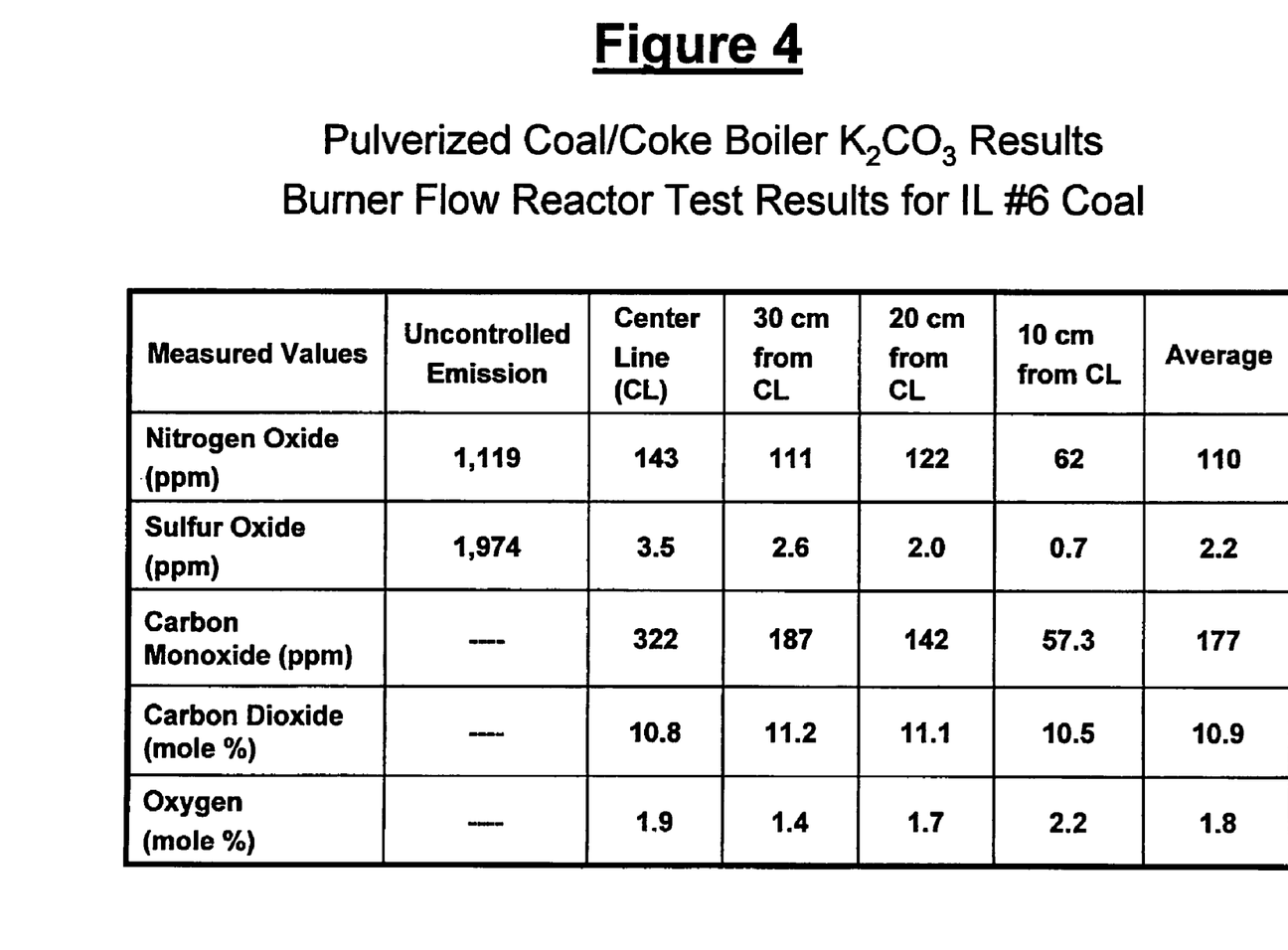
FIG. 4 is a table showing sulfur, nitrogen and carbon monoxide concentrations and mole percentage of carbon dioxide and oxygen at various points in the boiler unit for a pulverized coal/coke (PC) boiler with $K_2CO_3$ using Illinois #6 coal.

FIG. 4 is a table showing sulfur, nitrogen and carbon monoxide concentrations and mole percentage of carbon dioxide and oxygen at various points in the burner flow reactor test result at different measurement points for a pulverized coal/coke (PC) boiler with $K_2CO_3$ using Illinois #6 coal. The potassium to sulfur ratio was 1.35. The net sulfur oxide concentration was 2.2 ppm. The percentage of nitrogen recovered was 90.2% and the percentage of sulfur recovered was 99.9%.

Figure 5:
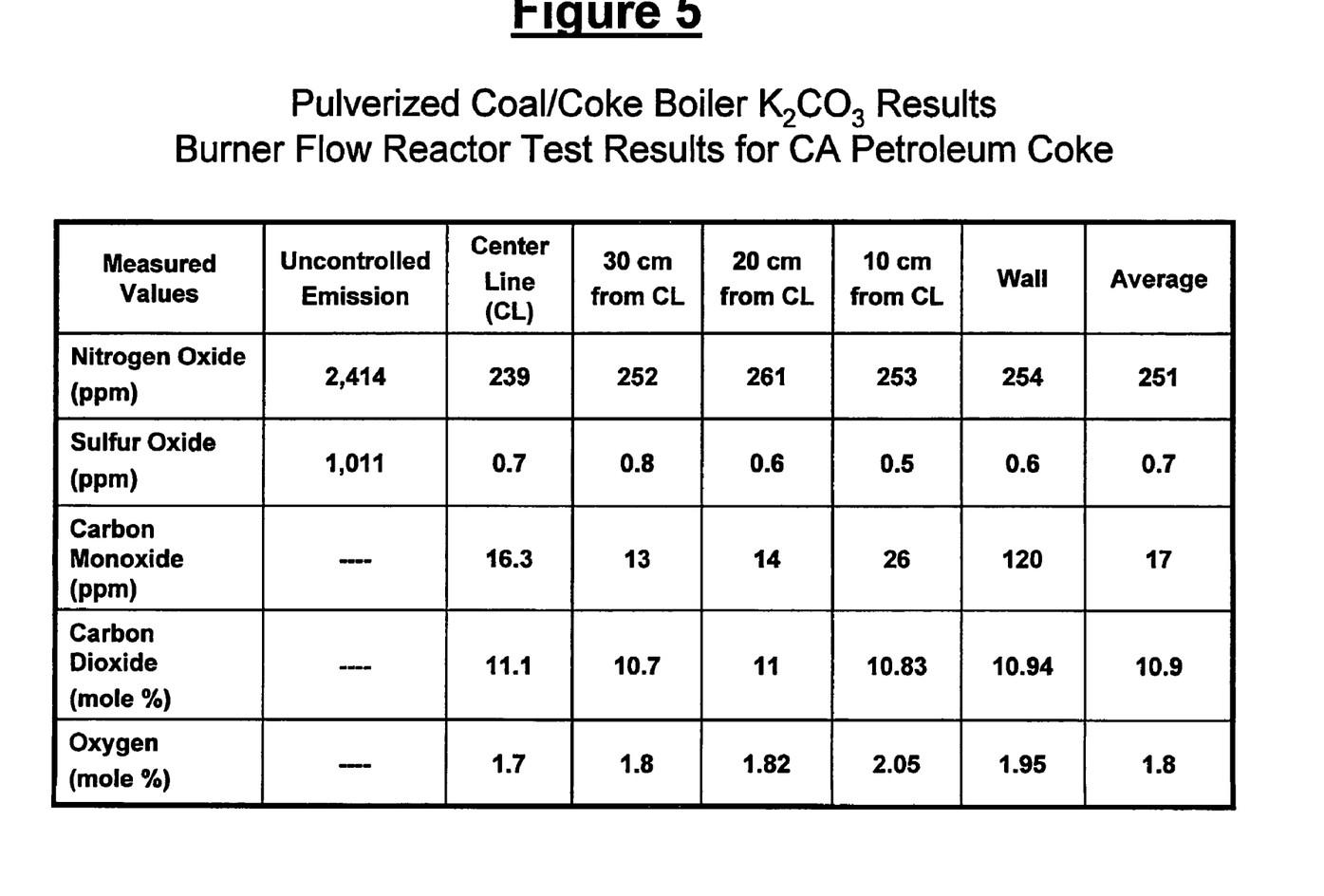
FIG. 5 is a table showing sulfur, nitrogen and carbon monoxide concentrations and mole percentage of carbon dioxide and oxygen at various points in the boiler unit for a pulverized coal/coke (PC) boiler with $K_2CO_3$ using California (CA) petroleum coke.

FIG. 5 is a table showing sulfur, nitrogen and carbon monoxide concentrations and mole percentage of carbon dioxide and oxygen at various points in the boiler unit for a pulverized coal/coke (PC) boiler with $K_2CO_3$ using CA (CA) petroleum coke. The potassium to sulfur ratio was 1.2. The net sulfur oxide concentration was 0.7 ppm. The percentage of nitrogen recovered was 86.9% and the percentage of sulfur recovered was 99.9%.

While particular elements, embodiments and applications of the present invention have been shown and described, it will be understood, of course, that the invention is not limited thereto since modifications can be made by those skilled in the art, particularly in light of the foregoing teachings. It is therefore contemplated by the appended claims to cover such modifications that incorporate those features coming within the scope of the invention.

What is claimed is:

1. A method of operating a coal/coke/heavy residual oil steam boiler to produce an exiting carbonaceous flue gas containing predominantly carbon dioxide with low nitrogen oxide, sulfur oxide and water concentrations, the method comprising:
   (a) admixing a carbon-based fuel with an alkali metal compound;
   (b) combusting the carbon-based fuel with a 95-100 percent pure oxygen stream and a flue gas recirculation stream, the recirculation stream containing predominately carbon dioxide; and
   (c) varying the mass flow ratios of the oxygen and recirculation streams such that a desired boiler temperature profile, a reduction in sulfur oxide concentration in said exiting carbonaceous flue gas to a concentration of less than 50 parts per million and a reduction in nitrogen oxide concentration in said exiting carbonaceous flue gas to a concentration of less than 100 parts per million is achieved.

2. The method of claim 1 wherein the carbon-based fuel is a pulverized solid carbon-based fuel.

3. The method of claim 2 wherein the solid carbon-based fuel is coal.

4. The method of claim 2 wherein the solid carbon-based fuel is petroleum coke.

5. The method of claim 2 wherein the solid carbon-based fuel is char.

6. The method of claim 1 wherein the carbon-based fuel is heavy residual oil fractions.

7. The method of claim 1 wherein the alkali metal compound is potassium carbonate.

8. The method of claim 1 wherein said exiting carbonaceous flue gas has an oxygen concentration of less than 100 ppm.

9. The method of claim 1 wherein said exiting carbonaceous flue gas has a water concentration of less than 100 ppm.

10. A method of operating a coal/coke/heavy residual oil steam boiler to produce an exiting carbonaceous flue gas containing predominantly carbon dioxide with low nitrogen oxide, sulfur oxide and water concentrations, the method comprising:

(a) combusting a carbon-based fuel with a 95-100 percent pure oxygen stream from an air separation unit and a flue gas recirculation stream in a combustion zone, the recirculation stream containing predominately carbon dioxide;

(b) introducing an alkali metal salt into the combustion zone containing the carbon-based fuel; and (c) varying the mass flow ratios of the oxygen and recirculation streams such that a desired boiler temperature profile, a reduction in sulfur oxide concentration in said exiting carbonaceous flue gas to a concentration of less than 50 parts per million and a reduction in nitrogen oxide concentration in said exiting carbonaceous flue gas to a concentration of less than 100 parts per million is achieved.

11. The method of claim 10 wherein the carbon-based fuel is a pulverized solid carbon-based fuel.

12. The method of claim 11 wherein the solid carbon-based fuel is coal.

13. The method of claim 11 wherein the solid carbon-based fuel is petroleum coke.

14. The method of claim 11 wherein the solid carbon-based fuel is char.

15. The method of claim 10 wherein the carbon-based fuel is heavy residual oil.

16. The method of claim 10 wherein the alkali metal salt is potassium carbonate.

17. The method of claim 10 wherein the exiting carbonaceous flue gas has an oxygen concentration of less than 100 ppm.

18. The method of claim 10 wherein the exiting carbonaceous flue gas has a water concentration of less than 100 ppm.

* * * * *